(12) United States Patent
Jarrett

(10) Patent No.: US 6,257,104 B1
(45) Date of Patent: Jul. 10, 2001

(54) LUG WRENCH

(76) Inventor: Phillip Jarrett, 74 Adelaide Road, SK7 1L4, Bramhall, Cheshire (GB)

( * ) Notice: Subject to any disclaimer, the term of this patent is extended or adjusted under 35 U.S.C. 154(b) by 0 days.

(21) Appl. No.: 09/316,955

(22) Filed: May 24, 1999

(30) Foreign Application Priority Data

May 26, 1998 (GB) .................................................. 9811102

(51) Int. Cl.[7] .................................................. B25B 23/16
(52) U.S. Cl. .......................................................... 81/177.8
(58) Field of Search ............................... 81/177.8, 177.1, 81/177.2, 177.5, 177.6, 58, 58.3, 60

(56) References Cited

U.S. PATENT DOCUMENTS

| | | | |
|---|---|---|---|
| 1,578,065 | * | 3/1926 | Bemus et al. ........................ 81/177.5 |
| 1,724,491 | * | 8/1929 | Mandl ..................................... 81/60 |
| 2,358,461 | * | 9/1944 | Latimer ................................. 81/482 |
| 2,549,910 | * | 4/1951 | Lane ..................................... 81/177.5 |
| 2,738,694 | * | 3/1956 | Boatright ............................. 81/177.6 |
| 2,797,599 | * | 7/1957 | McGarvie, Jr. ....................... 81/58.3 |
| 2,968,980 | * | 1/1961 | Zierold ................................ 81/177.5 |
| 3,349,653 | * | 10/1967 | Kaufman et al. ........................ 81/60 |
| 4,611,514 | * | 9/1986 | Hyde ......................................... 81/60 |
| 5,001,947 | * | 3/1991 | Andersen-Vie ....................... 81/58.1 |
| 5,522,287 | * | 6/1996 | Chiang ..................................... 81/60 |
| 5,685,207 | * | 11/1997 | Hubert ................................ 81/177.5 |
| 5,797,300 | * | 8/1998 | Fairbanks ................................ 81/60 |

\* cited by examiner

Primary Examiner—Derris H. Banks
Assistant Examiner—David B. Thomas

(57) ABSTRACT

A lug wrench for tightening and loosening of vehicle wheel nuts and incorporating at least one pair of drive heads or socket heads (11, 6) for cooperation with or engagement of a wheel nut. The socket head (6) may be located selectively at either end of an unequal L-shaped bar (14) enabling the brace to be gripped at (12) or (13) for the respective loosening or tightening of wheel nuts. A one-way ratchet mechanism (15) is adapted to be locked in the wheel nut loosening direction but is free in the wheel nut tightening direction preventing use of the longer length bar to tighten the nuts. A jack-driving attachment (9, 10) may be provided and attached in place of socket head (6). The lug wrench may comprise several separate parts attached or attachable together to provide the appropriate L-shaped configuration such that a nut loosening torque may be approximately twice the available nut tightening torque.

9 Claims, 9 Drawing Sheets

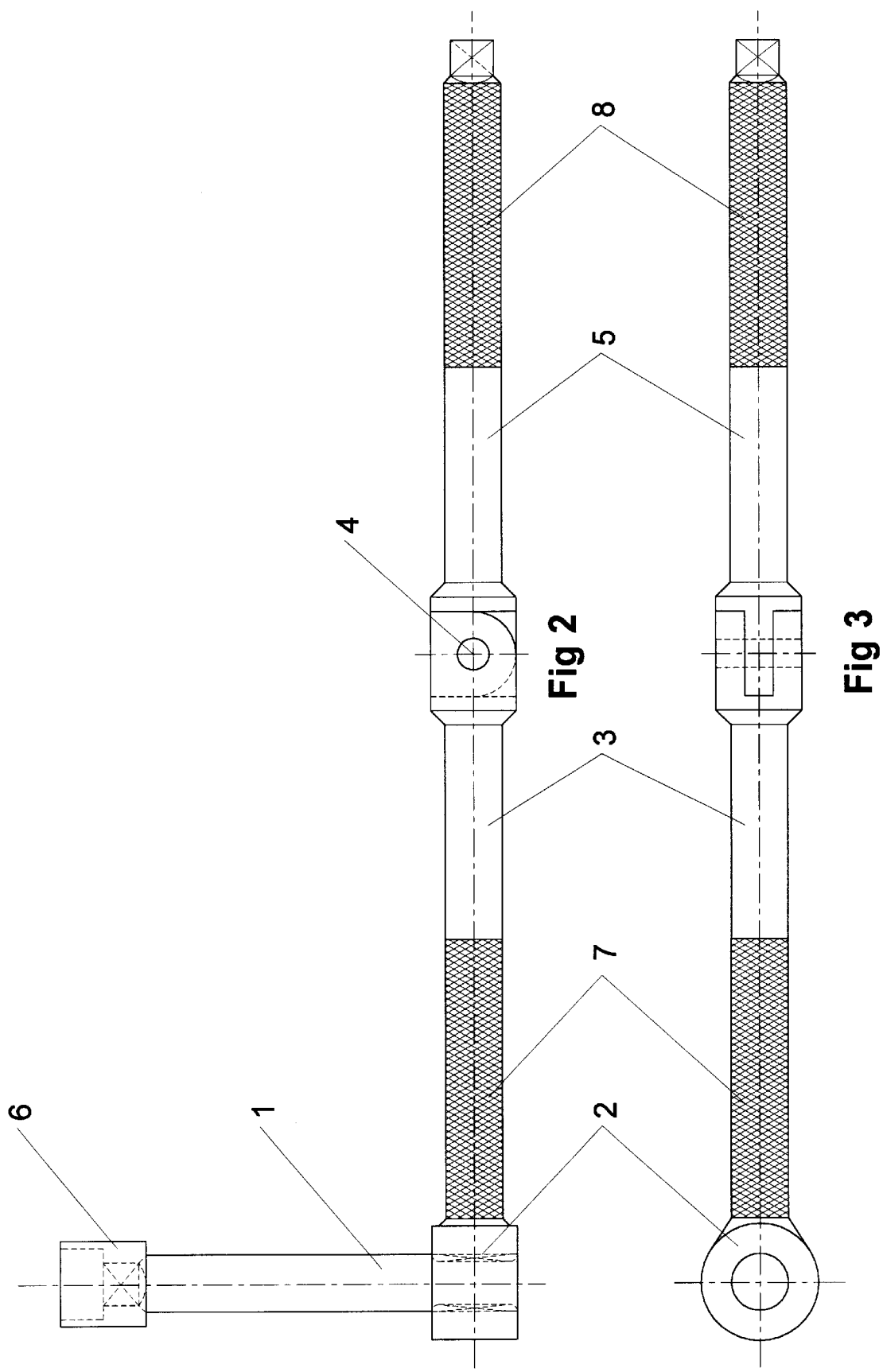

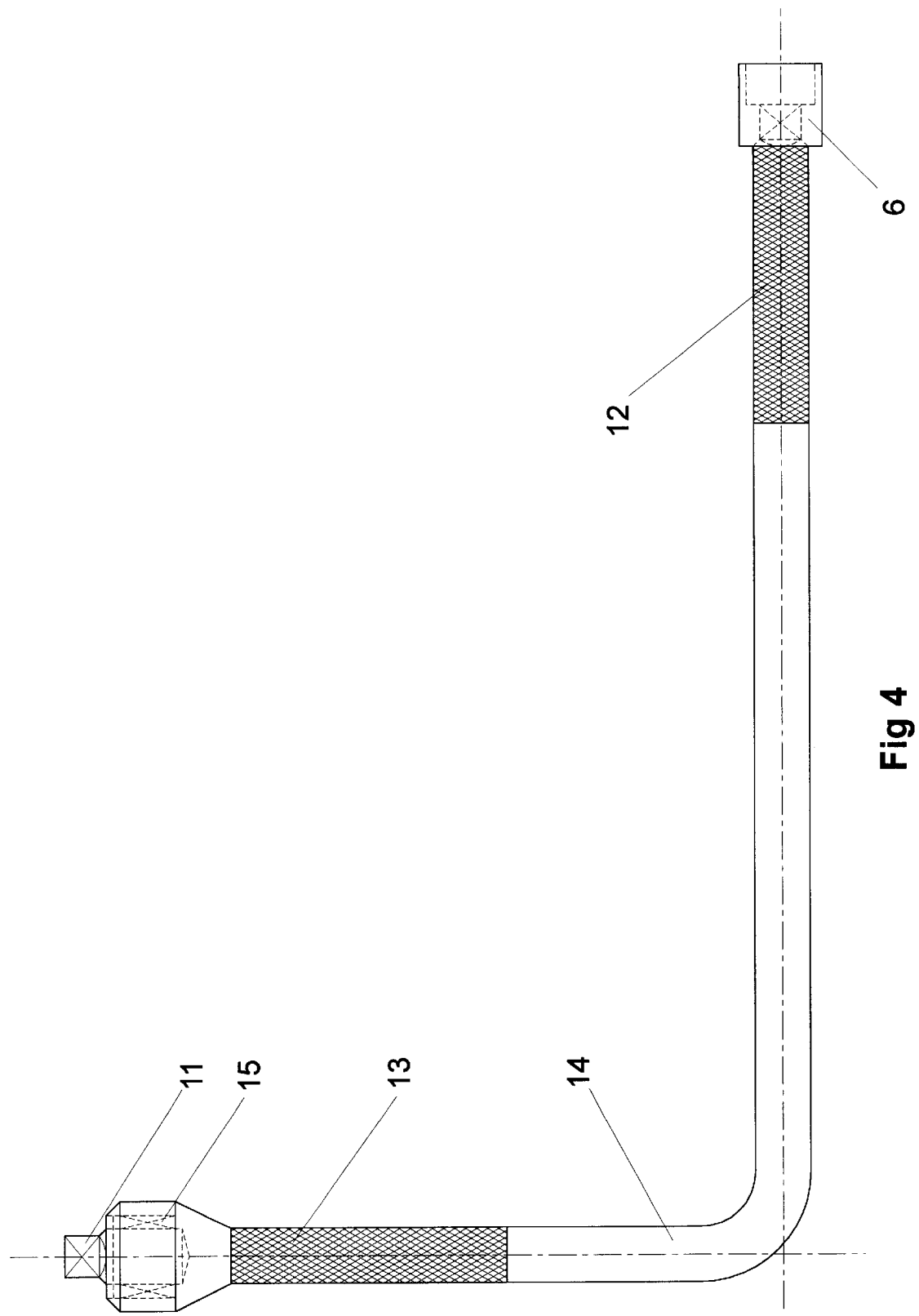

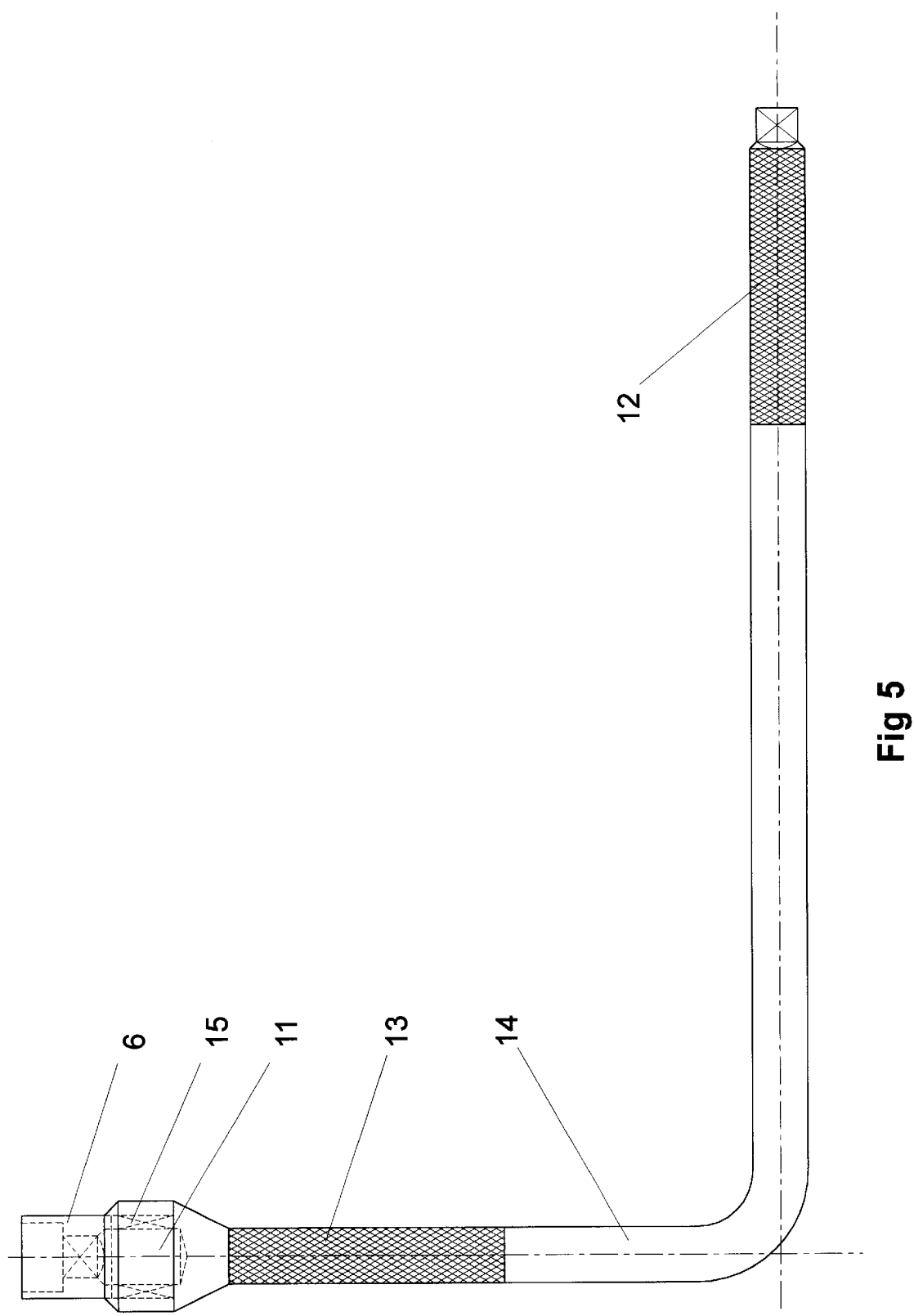

LUG WRENCH

CROSS REFERENCE TO RELATED APPLICATIONS

GB 9811102.4 filed in the UK on May 6, 1998 with title Wheel Brace

STATEMENT REGARDING FEDERALLY SPONSORED RESEARCH OR DEVELOPMENT:

Not Applicable

REFERENCE TO A MICROFICHE APPENDIX:

Not Applicable

BACKGROUND OF THE INVENTION

The present invention relates to a lug wrench (sometimes known as a wheel brace) for the tightening and loosening of wheel nuts on vehicles of various kinds.

It is sometimes necessary to change a wheel and replace with a spare, for example, due to a puncture of the tire, or, other wheel/tire damage. In practice, it is often difficult to loosen the wheel nuts, due to previous over-tightening, and/or, slight corrosion between the nuts and their associated studs.

It is customary for a lug wrench to be supplied, with the vehicle, by the manufacturer of the latter. However, to prevent over-tightening of the wheel nuts and to allow compact storage of the lug wrench, the latter is normally relatively short in length, thus typically requiring a significant amount of strength to be applied to loosen the wheel nuts.

To overcome the latter problem, one type of commercially available lug wrench (sometimes known as an extending lug wrench) comprises an outer tube, which slides over an inner bar having a square drive for a socket head at the wheel nut end. The product is capable of providing additional leverage for the loosening of wheel nuts by extending the outer tube away from the wheel nut axis. When tightening the wheel nuts, the extending lug wrench is intended to be utilized in the retracted mode to avoid over-tightening, which is likely to result in future wheel nut removal problems and, in extreme cases, could damage the threads on the wheel studs and/or nuts. However, utilization in this way relies entirely on the user taking care to fully retract the lug wrench outer tube prior to wheel nut tightening.

There is various prior art which addresses the problem of preventing wheel nuts being over-tightened due to the application of an excessive tightening torque by the user. For example, EP 0086082 discloses a form of torque limiting ratchet to prevent over-tightening of nuts, with the lug wrench embodiment described having a mechanical advantage provided by the use of gearing. The ratchet disclosed comprises a pair of discs, each having a series of ramps, arranged face-to-face and loaded together by a spring up to a predetermined limit. The embodiment described involves the use of epicyclic gearing requiring external constraint (on the wheel rim) of one of the ring gears and cage and thus requires means to engage another wheel nut or the wheel rim. The need for a torque limiting ratchet, the use of epicyclic gearing and the requirement for external constraint make the lug wrench relatively costly to produce and complicated to use.

BRIEF SUMMARY OF INVENTION

One objective of the present invention is to provide a lug wrench, which allows substantial additional torque to be applied during wheel nut loosening, but prevents this extra torque being made available during wheel nut tightening; lug wrench embodiments being capable of low cost manufacture.

According to the present invention, there is provided a lug wrench incorporating at least one pair of drive heads or socket heads for co-operation with or engagement of a wheel nut, when the lug-wrench is configured in such as a way that the longitudinal axes of the respective drive heads or socket heads comprising each said pair are disposed approximately perpendicular to one another, the torque which can be applied in the nut loosening direction by one (drive head or socket head in combination with the) of the drive heads or socket heads having an associated one-way drive element is greater than can be applied in the nut tightening direction by the other drive head or socket head of a pair, under any optional lug wrench configuration that may be available.

BRIEF DESCRIPTION OF THE SEVERAL VIEWS OF THE DRAWINGS

Several specific embodiments of the present invention will now be described, as examples, with reference to the accompanying drawings:

FIG. 2 shows the same embodiment (as FIG. 1), configured so as to provide additional leverage for the loosening of wheel nuts;

FIG. 3 is another side view of the embodiment of FIG. 2;

FIG. 4 shows a second embodiment of the lug wrench, configured for the tightening (or loosening) of wheel nuts; or, when used as a drive for a lifting jack;

FIG. 5 shows the same embodiment (as FIG. 4), configured to provide additional leverage for the loosening of wheel nuts;

DETAILED DESCRIPTION OF THE INVENTION

Figure 1:
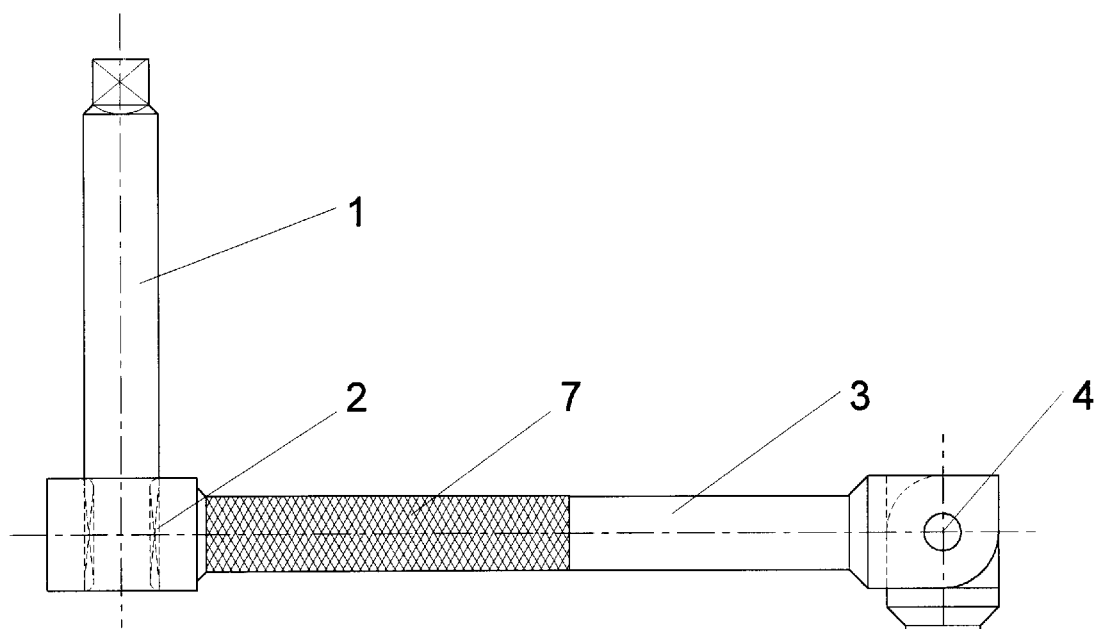
FIG. 1 shows one embodiment of the lug wrench configured for the tightening (or loosening) of wheel nuts; or, when used as a drive crank for a lifting jack, or for nut running during tightening or loosening.

Referring to FIGS. 1 to 3, item 6 is a removable attachment in the form of a socket head for engaging a wheel nut, the socket head being attachable to either end of the lug wrench via a standard square drive (as shown), or, via some other arrangement, such as an hexagonal drive. An alternative attachment (FIG. 1a) comprises integral items 9 and 10, item 9 being a female socket for engaging the square male drive on the lug wrench and item 10 being a hook for engaging a vehicle lifting jack drive. In an alternative embodiment (not shown), two socket heads may be forged integral with the lug wrench (one at each end) and, in this case, the hook attachment 9, 10 may not be used.

Items 1 and 5 are torque bars, which can be connected to one or more of the attachments described in the foregoing paragraph.

Item 3 is a connecting bar and, at one end, incorporates a one-way ratchet 2 for driving torque bar 1 whereas, at the other end, item 3 has a 90 degree hinge 4 connecting torque bar 5. The hinge is formed from a lug at the end of torque bar 5 and a slot in the connecting bar 3, the torque bar and connecting bar relatively rotating about the hinge 4. However, it should be noted that other hinge arrangements are possible. For example the lug and slot could be reversed, or the hinge could comprise a single mating lug at the end of each bar. The hinge pin may be a hardened carbon steel or stainless steel pin, or a bolted or studded connection or a rivet.

Parts 7 and 8 of connecting bar 3 and torque bar 5, respectively, are hand grips, which might be machine knurled (as shown) or covered in a suitable non-slip material, such as a rubber sleeve.

Referring to FIG. 1, the socket head 6 is shown as fitted to the end of torque bar 5 and thus, if the connecting bar is gripped at 7 (or, the torque bar 1 is gripped), a tightening (or, loosening) leverage may be applied to the wheel nut. Also, if torque bar 1 is gripped, the lug wrench can be used for nut running purposes, during tightening or loosening. Alternatively, if the socket hook 9, 10 is fitted in place of socket head 6 and engages the lifting jack drive, torque bar 1 can be gripped to crank the lifting jack. It will further be noted in FIG. 1 that the oneway ratchet and the 90 degree hinge form the corners of an "S" shaped configuration.

Referring to FIGS. 2 to 3, the socket head 6 is shown as alternatively fitted to the end of a torque bar 1, with torque bar 5 having been rotated through approximately 90 degrees (as compared to FIG. 1) to lie along the same axis as the connecting bar 3, thus making an in-line extension to the latter. If leverage is applied to the wheel nut at hand grip 8, with the torque transmitted via one-way ratchet 2, the latter is locked in the anti-clockwise direction thus enabling the wheel nut to be loosened with an increased leverage (as compared to FIG. 1). If it is attempted to transmit a tightening torque to the wheel nut, then the one-way ratchet allows the in-line connecting bar 3/torque bar 5 to rotate clockwise relative to torque bar 1, which thus remains stationary.

Comparing FIG. 1 and FIGS. 2–3, the maximum leverage that can be applied to the wheel nut in FIG. 1 is determined by the length of connecting bar 3. However, the maximum leverage which can be applied to the wheel nut in FIGS. 2–3 is determined by the length of the connecting bar 3 plus the length of the torque bar 5. If these bars are of similar length (as shown), then the maximum leverage which can be applied to the wheel nut during loosening (as FIGS. 2–3) is approximately twice the maximum leverage which can be applied during tightening (as FIG. 1). However, in modified embodiments (not shown), it is clear that other leverage ratios are possible, by varying the relative lengths of torque bar 5 and connecting bar 3.

Referring to FIGS. 4 and 5, item 14 is an "L" shaped component either being forged as a single right angled bar (as shown), or, made from multiple forged components, permanently joined together, At one end of item 14, there is a square drive for receiving items 6 or 9. At the other end, there is a one-way ratchet 15, fitted with a stub shaft 11 having a male square drive for socket head 6.

In this embodiment, the ratchet 15 is positioned near or immediately adjacent to the socket drive head capable of applying the greatest nut loosening torque to the wheel nut. With the ratchet 15 in this position, no bending moment will be imposed on the ratchet when the lug wrench is used for nut tightening or operation of the lifting jack, which should result in an increased service life for the ratchet. The parts 12 and 13 on bar 14 are hand grips.

If the bar 14 is gripped at 13, a tightening (or loosening) leverage may be applied to the wheel nut.

If the bar 14 is gripped at 12, increased leverage can be applied to the wheel nut via the socket head 6 fitted to the stub shaft 11. The torque is transmitted to the wheel nut via the one-way ratchet 15, which is locked in the anti-clockwise (nut loosening) direction, but free in the clockwise direction allowing relative movement between the bar 14 and the socket head 6, which thus remains stationery.

Comparing FIGS. 4 and 5, due to the unequal lengths of the arms of bar 14, the leverage which can be applied as shown in FIG. 5 (during nut loosening) is approximately twice the leverage which can be applied in FIG. 4 (during nut tightening). However, once again, other ratios are possible by varying the relative lengths of the two arms of bar 14.

Figure 6:
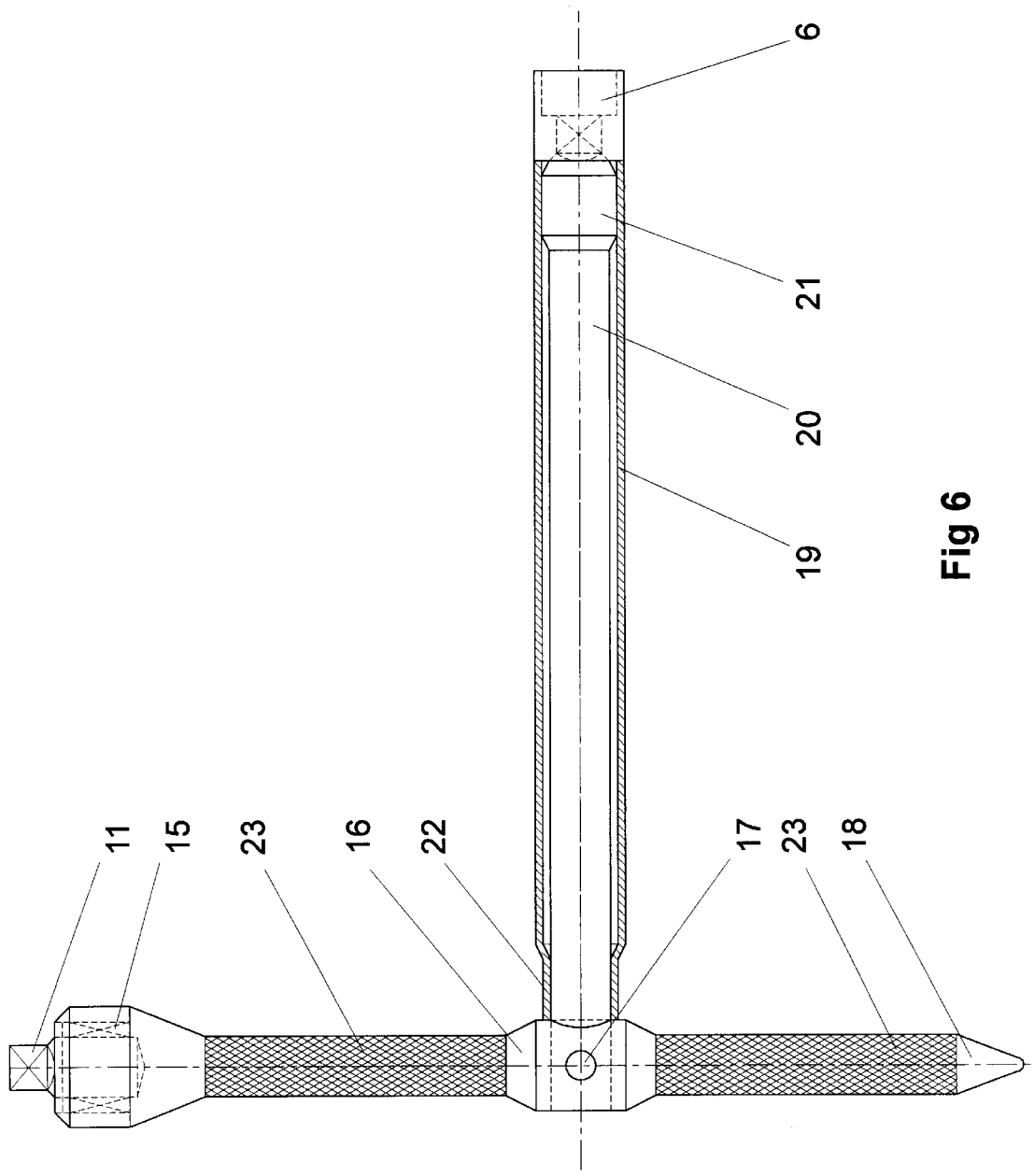
FIG. 6 shows a third embodiment of the lug wrench, configured for the tightening (or loosening) of wheel nuts; or, when used as a drive for a lifting jack; or, when used to remove a wheel trim prior to loosening the wheel nuts.

Referring to FIG. 6, a lever bar 16 forms the "top" of a "T" shaped assembly and might be forged from a single bar (as shown), or, made from multiple forged components, permanently joined together. One end of bar 16 houses the one-way ratchet 15 and stub shaft 11, as in FIG. 5. The other end is shaped to provide a chisel shaped wheel trim removal tool 18. Alternatively, the latter may be a permanently attached molding made from plastics to prevent possible damage to the wheel trim.

Torque bar 20 is shown attached to lever bar 16 via a location hole through the enlarged central portion of item 16 and retained in position by pin 17. At its other end torque bar 20 has a male square drive for socket head 6 or the lifting jack attachment 9, 10. The latter may be driven via a pair of hand grips 23 positioned one on each side of the central portion of item 16, thus allowing tightening (or loosening) of the wheel nut or operation of the lifting jack.

Again, referring to FIG. 6, if socket head 6 is removed from torque bar 20 and fitted instead to stub shaft 11, then leverage may be applied to loosen the wheel nut by gripping an outer tube 19 on bar 20. This leverage may be further increased by extending outer tube 19 along torque bar 20 until a reduced diameter portion 22 of tube 19 is restricted from further movement by a collar 21 formed near the end of torque bar 20. Under these circumstances, the leverage available is nominally the sum of the lengths of items 19 and 20, respectively; being substantially greater than the overall length of lever bar 16. Once again, the one-way ratchet 15 which is locked in the anti-clockwise nut loosening direction prevents this extra leverage being used for wheel nut tightening purposes.

As a further alternative to this embodiment, the one-way ratchet 15 may be located at the point of intersection of items 16 and 20. In this case, one end of item 16 is simplified to a male square drive for engaging socket head 6.

Figure 7:
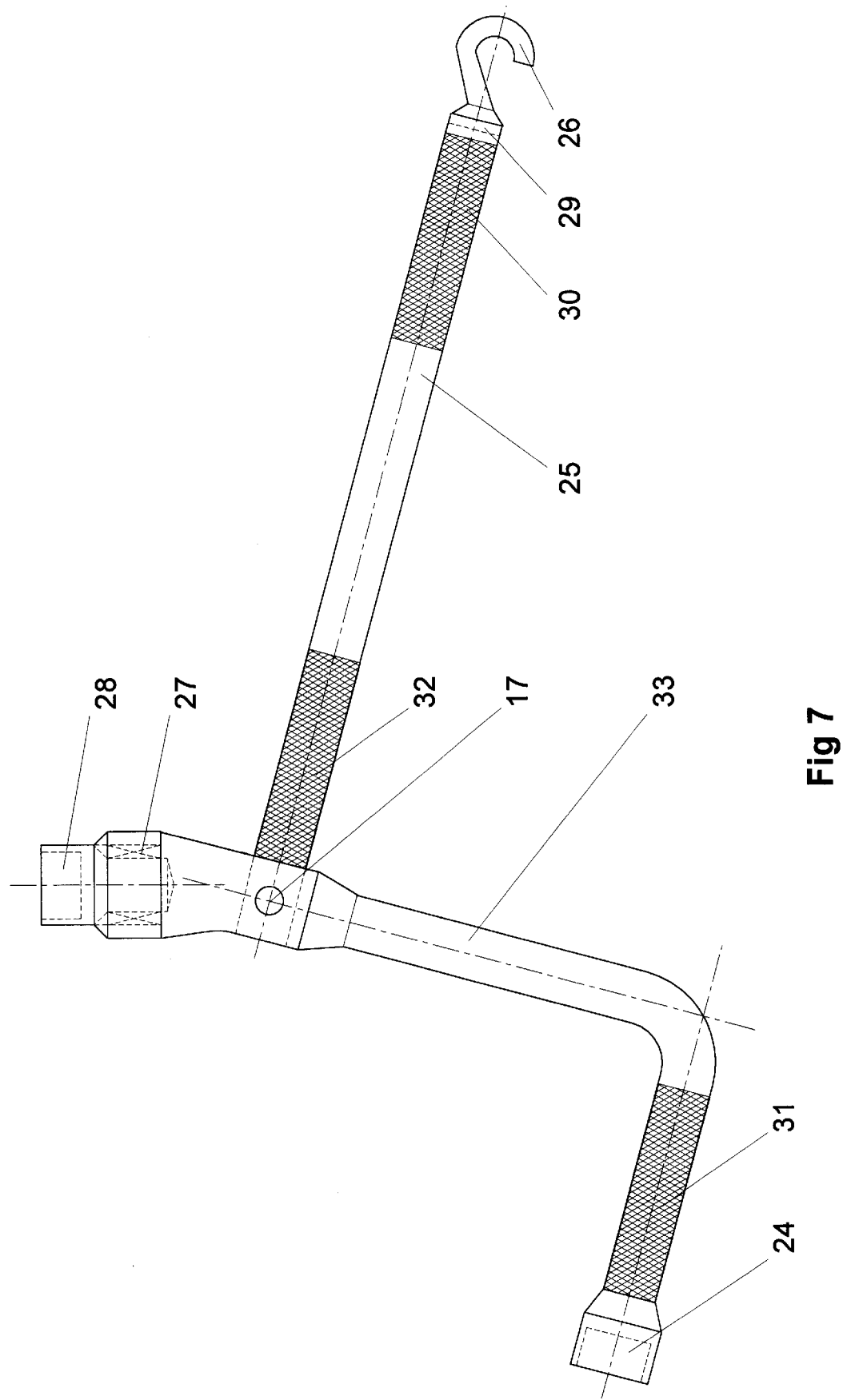
FIG. 7 shows a fourth embodiment of the lug wrench, as might be provided by an original equipment manufacturer, for dedicated use with the vehicle supplied.

Referring to FIG. 7, lever bar 25 has at one end a slot 29 to locate a permanently attached lifting jack drive hook 26, which may be cranked by gripping the lug wrench at a hand-grip 31 and rotating about the longitudinal axis of item 25. For this purpose, hand-grip 31 may have an internal tube (not shown) fitted to bar 33 and able to rotate about the central axis of a socket head 24. Lever bar 25 is attached to item 33 via a location hole through the enlarged portion of item 33 and retained in position by pin 17.

At one end of item 33 socket head 24 is permanently attached for tightening (or, loosening) a wheel nut when lever bar 25 is gripped at hand-grip 32 and rotated about the longitudinal axis of the socket head 24. At the other end of item 33 is located an integral stub shaft/socket 28 for loosening the wheel nut when lever bar 25 is gripped at hand-grip 30. A one-way ratchet 27 (which is locked in the anti-clockwise nut loosening direction only) prevents the lever bar 25 being used for wheel nut tightening purposes. Due to its complexity, bar 33 is preferably made from multiple components permanently attached together.

Again, referring to FIG. 7, if the distance from the longitudinal axis of lever bar 25 to the longitudinal axis of socket 24 is compared to the nominal length of level bar 25, it will be noted that the leverage available for loosening the wheel nut is significantly greater than available for nut tightening. If the length of lever bar 25 were to be increased with the other overall lug wrench dimensions remaining the same, then even more nut loosening leverage may be achieved.

The longitudinal axis of lever bar 25 makes an obtuse angle with the longitudinal axis of integral stub shaft/socket 28 in order to clear the wheel arch of the vehicle, with 120 degrees being a typical angle for this type of lug wrench configuration.

Figure 8:
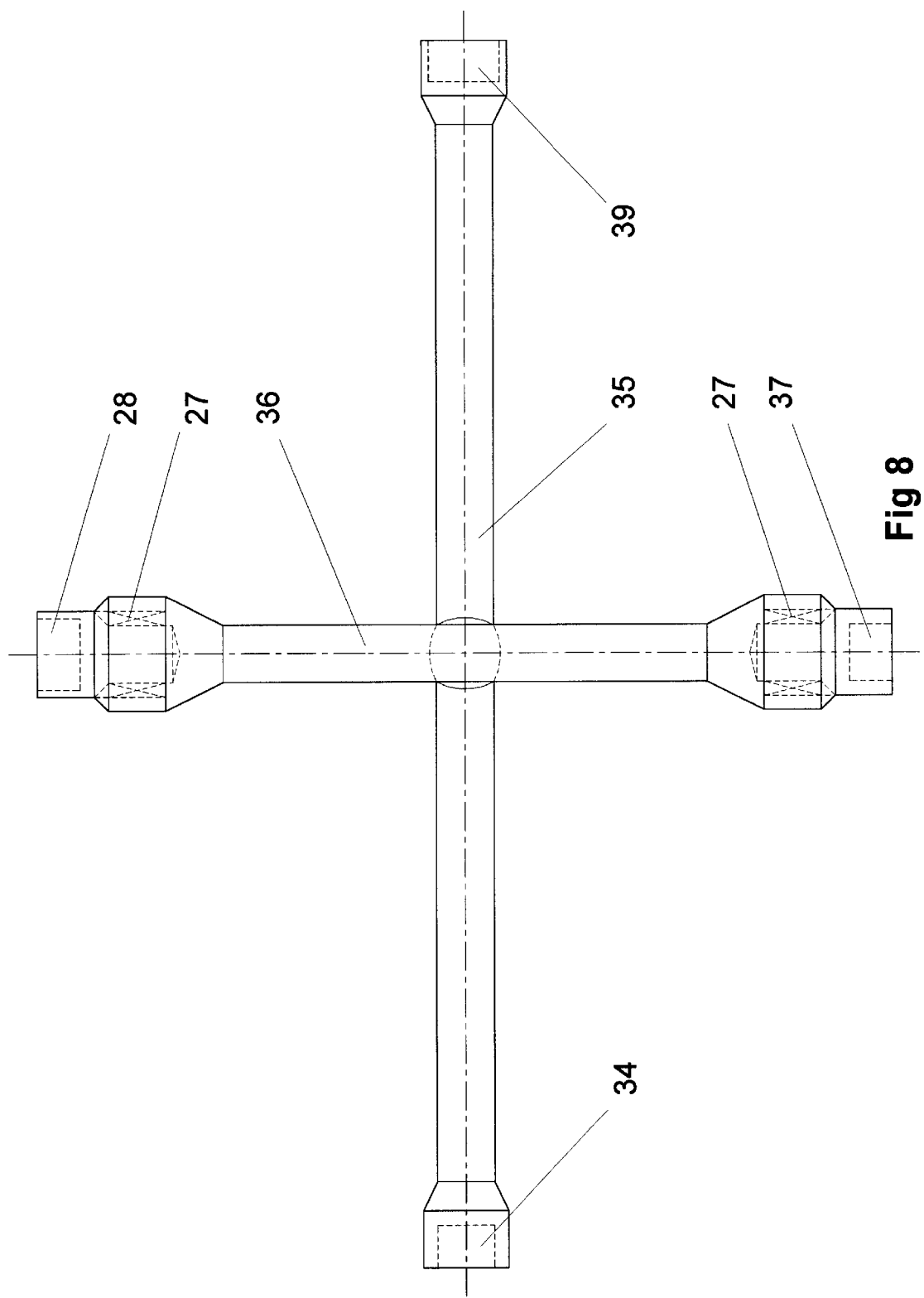
FIG. 8 shows a fifth embodiment of the invention applied to a typical "spider" type of lug wrench; except that instead of four different fixed sockets, there are two pairs of fixed sockets for engaging two different sizes of wheel nut, respectively.

Referring to FIG. 8, bars 35 and 36 are disposed at right angles and are joined at their respective mid-points, for example, by a friction weld. Bar 35 is significantly longer than bar 36 thus providing additional leverage for nut loosening purposes by different sized integral stub shafts/sockets 28 and 37 compared to the leverage available for nut tightening purposes by different sized integral sockets 39 and 34. Again, two one-way ratchets 27 are locked in the anti-clockwise direction only relative to the engaged wheel nut and thus prevent the additional available leverage being used for nut tightening.

Figure 1A:
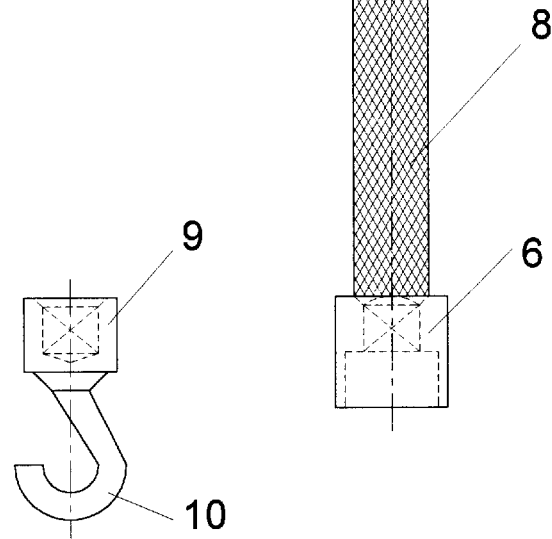
FIG. 1a shows an accessory.

Again, in FIG. 8 a hook similar to hook 9, 10 in FIG. 1a, but provided with a male hexagonal socket could be inserted into integral socket 34 or 39 for the purpose of driving a vehicle lifting jack.

All of the embodiments described with reference to FIGS. 1 to 10, make use of one or more one-way ratchets within their configuration. The detail design of the ratchets may be similar to those typically used in hand tools, except that there is no changeover device for switching from clockwise to anti-clockwise rotation of the ratchet and vice versa. Hand tool ratchets typically require a single spring-loaded pawl for reversible engagement with the ratchet teeth. However, the present invention requires a one-way drive element only and thus multiple pawl ratchets can be used, significantly increasing the torque which may be transmitted for a given ratchet diameter.

Figure 9:
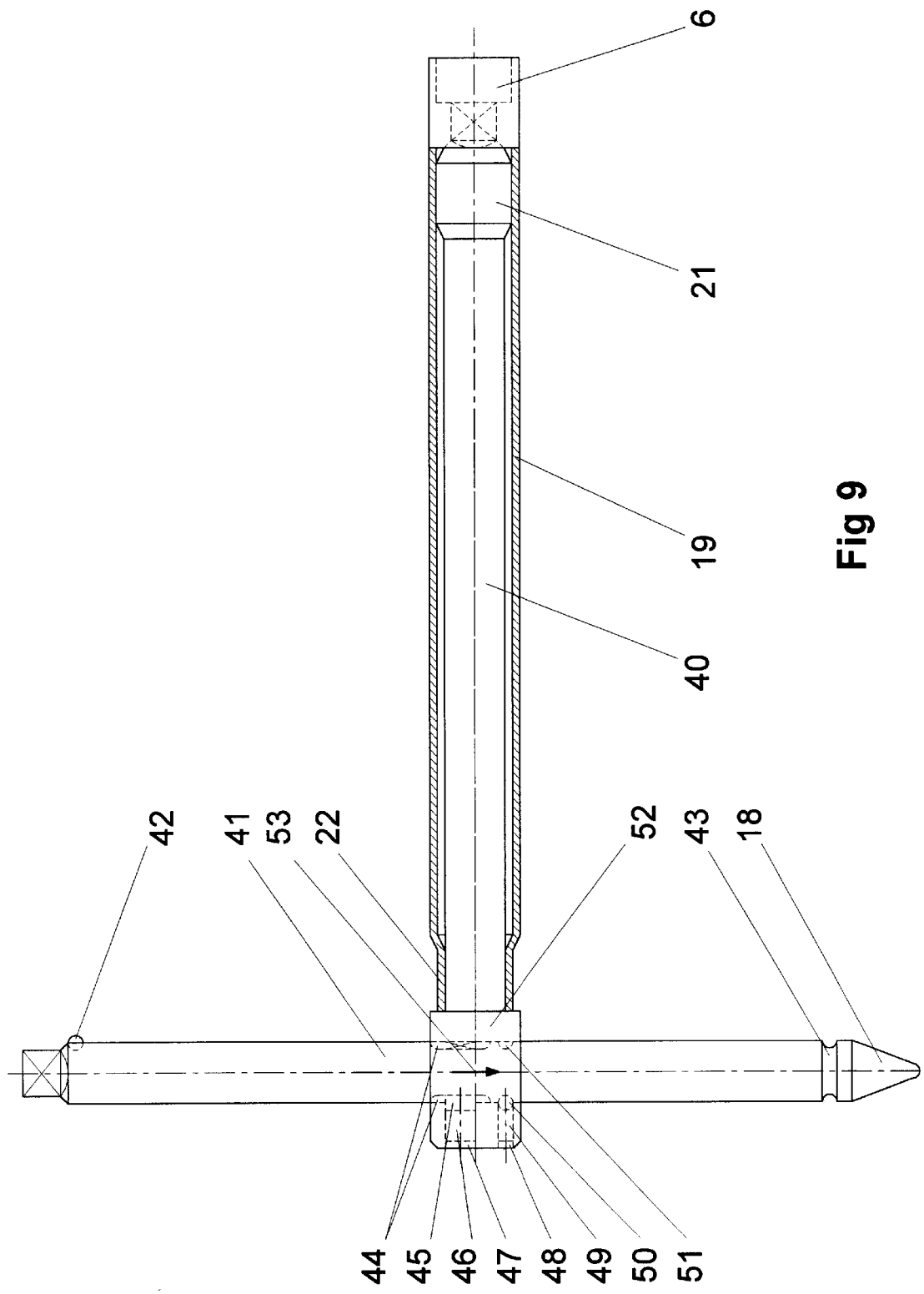
FIG. 9 shows a sixth embodiment of the invention in a form that can optionally be disassembled thus providing the possibility of compact storage within the vehicle.
Figure 10:
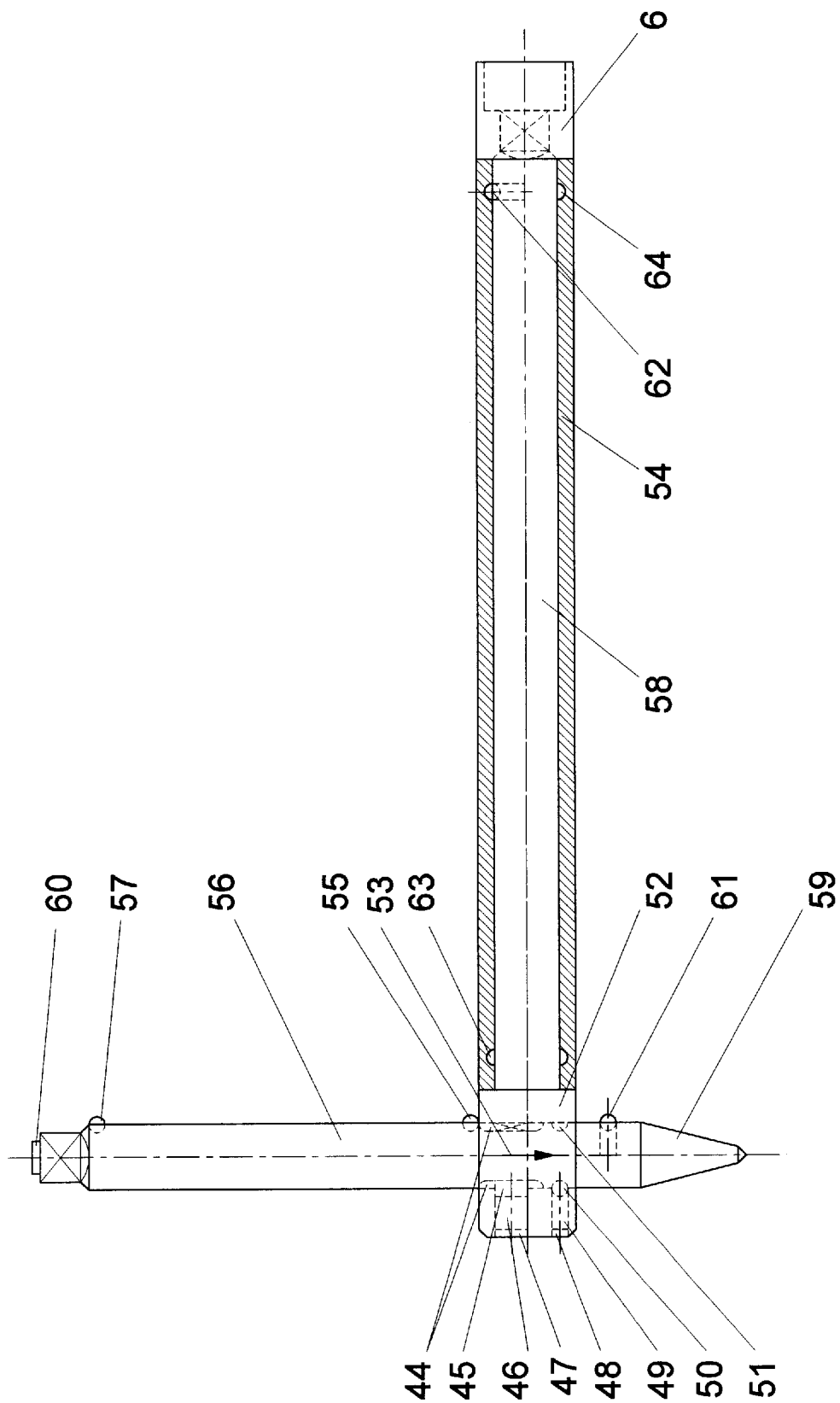
FIG. 10 shows a seventh embodiment of the invention in a form suitable for use as a general purpose mechanic's tool.

Referring to FIGS. 1–3, the alternative ratchet location mentioned in relation to FIG. 6 and FIGS. 9 and 10, the one-way ratchet operation within these lug wrench configurations suggests use of the "pear head" type of ratchet design, where the pawl is external to the ratchet teeth. On the other hand, referring to the ratchet locations shown in FIGS. 4–8, then use of the "round head" type of ratchet design is preferable, where the pawl is incorporated in the stub shaft and runs within the surrounding ratchet teeth.

Again, in all embodiments, the use of a ratchet to provide the one-way drive element required by the present invention has been described for the reasons of relative cheapness and familiarity to hand tool manufacturers.

However, other one-way drive elements are possible, for example, including spring-loaded rollers or balls mounted between an outer sleeve and an inner rotational member having cam flats machined around its periphery ((similar to some types of overrunning clutch)). This construction is similar to some types of overrunning clutch, as described by Joseph E Shigley, page 510, *Mechanical Engineering Design*, McGraw-Hill (1963).

In order to provide the optimum torque for wheel nut tightening purposes, the lug wrench embodiments described might typically have a hand tightening leverage available of 200 mm to 400 mm, depending on the application. For wheel nut removal purposes, the extra leverage available is limited mainly by the need for compact lug wrench storage within the vehicle, with the wheel nut hand loosening leverage likely to be at least twice the tightening leverage, namely, 400 mm to 800 mm. These hand tightening and loosening leverage figures are considered typical for normal passenger car applications but, for example, might be made higher for light commercial and off-road passenger vehicles.

Referring to FIG. 9, a removable lever bar 41 is shown as made from a single forged bar with, at one end, a male drive socket and, at the other end, a wheel trim removal tool 18. Near its mid-point, the lever bar 41 has machined splines 44 as one part of a one-way ratchet mechanism; the ratchet pawl 45 being held in contact with the splines 44 by a spring (not shown) retained by a cap 47 within a drilled hole 46. The ratchet pawl 45 is also captively retained within the housing 52, if lever bar 41 is removed.

Adjacent to the splines 44 lever bar 41 has a machined location groove 51, which provides a seating for spring-loaded ball 50 (the spring housed within a drilled hole 49 is not shown, the spring being retained by a cap 48). Similar to pawl 45, ball 50 is captively retained within the housing 52, if lever bar 41 is removed. The function of ball 50 and location groove 51 is to maintain the ratchet pawl 45 at its optimum position (along the axis of lever bar 41) relative to the splines 44.

If the lever bar 41 is slid axially by hand within housing 52, a machined location groove 43 (near the trim removal end) when in contact with spring loaded ball 50 provides an alternative semi-fixed position for the lever bar 41, thus effectively providing an alternative "L" shaped configuration (not shown) for the lug wrench, for example, if preferred by the end-user for wheel nut tightening purposes via socket head 6.

Near the other end of lever bar 41, ball 42 is shown as permanently attached (for example, glued or brazed) within a spherical recess in bar 41, thus providing a "stop" if bar 41 is moved in the opposite direction. In this instance, the ball 42 is shown in preference to a location groove, to avoid weakening the bar 42 along the length used for undoing stubborn wheel nuts and near the cross section subject to the highest bending moment due to the hand force applied to tube 19.

The ball 42 also serves to prevent the user inserting the male drive socket end of lever bar 41 into housing 52, thus encouraging re-assembly of the lug wrench via the opposite trim removal end of lever bar 41. In addition, housing 52 has at least one inscribed arrow 53 on t he side of the housing to indicate the correct direction of insertion, for the one-way ratchet mechanism to be fully functional. In the event of the user inserting the lever bar 41 the wrong way round, then due to the shaped end (not shown) of the pawl 45, the ratchet mechanism will be unable to transmit any appreciable torque, in either direction. The various foregoing design features make re-assembly of the lug wrench by the end-user both straightforward and fail-safe.

The housing 52, torque bar 40 and collar 21 are shown as all formed from a single forging. Similarly as described for FIG. 6, outer tube 19 may be slid along bar 40 (with socket head 6 removed) to provide substantial additional leverage for wheel nut loosening compared to the maximum leverage available for wheel nut tightening.

Referring to FIG. 10, a lever bar 56 can also be removed from housing 52 and optionally used as a cold chisel, for "turning out" any bolts with damaged heads. The cutting end 59 of the cold chisel has sides typically ground to about 70–80 degrees (to the horizontal) while the rest of the tip is ground to a shallower sharper angle. The male socket end of lever bar 56 is protected from hammer blows by a head 60. The cutting end 59 and the head 60 are locally heat treated (hardened and tempered) to obtain a sharp cutting edge (at end 59) and to prolong the service life of the parts.

In FIG. 10, the detail within housing 52, namely, the one-way ratchet mechanism and its associated axial location device is the same as already described with reference to FIG. 9. Similarly, the housing 52 has an inscribed arrow 53 to assist the user to assemble the tool correctly.

Again in FIG. 10, balls 55 and 57 are permanently attached within respective spherical recesses in lever bar 56. Ball 55 provides a "stop" to prevent bar 56 passing further through housing 52 and ball 57 prevents outer tube 54 being slid over the male drive socket end of bar 56. Ball 57 also encourages correct assembly of the tool. Outer tube 54 can optionally be slid onto the other end of bar 56 (the end with the cutting tool 59) and located via spring loaded ball 61 seating in grooves 63 or 64, thus to provide the end user with extra leverage for nut tightening than is available via lever bar 56 alone. The function of the "stops" described, in conjunction with the relatively short protruding length (from housing 52) for the cutting tool end of bar 56, prevent the possibility of over-tightening of nuts via socket head 6 (when in the position shown in FIG. 10).

Also, in FIG. 10, the housing 5 2 and torque bar 58 are shown as formed from a single forging. Similarly, as described for FIG. 6, outer tube 54 may be slid along bar 58 (with a socket head 6 removed) to provide substantial additional leverage for nut loosening compared to the maximum leverage available for nut tightening. To encourage the user to retain a minimum contact length between tube 54 and bar 58, depending on which way around tube 54 has previously been slid onto bar 58, the spring-loaded ball 62 locates either in groove 63 or 64 (these grooves are equidistant from their respective tube ends).

Throughout the Specification, the terms "torque bar" and "lever bar" are interchangeable for most of the described embodiments because, for a given pair of drive heads or socket heads, the torque bar for the one drive head or socket head often functions as the lever bar for the other drive head or socket head.

Throughout the Specification, any reference to a wheel nut is to be construed as including a wheel bolt as an alternative form of fixing device for vehicle wheels.

I claim the following:

1. A lug wrench which when assembled comprises a single tool incorporating: at least one pair of drive heads or socket heads for co-operation with or engagement of a wheel nut; at least one pair of lever bars for applying torque to the respective drive heads or socket heads of a pair, one of the lever bars being or capable of becoming when fully extended of greater length than the other; a non-adjustable one-way drive element associated with one socket head or drive head of each pair; and when the lug wrench is configured in such a way that the respective drive heads or socket heads of a pair are capable of transmitting torque and are disposed approximately perpendicular to one another, there is an inherent limitation on the relative maximum torque which can be applied by the drive heads or socket heads of the pair; the torque which can be applied in the nut loosening direction by the drive head or socket head having an associated non-adjustable one-way drive element is greater than can be applied in the nut tightening direction by the other drive head or socket head of the pair, under any optional lug wrench configuration which may be available other than by the addition of an extension bar connected to a drive head or socket head.

2. A lug wrench according to claim 1, wherein each non-adjustable one-way drive element comprises a one-way ratchet mechanism.

3. A lug wrench according to claim 1, wherein there is a single pair of lever bars, one of the lever bars being of adjustable length comprising two members connected together via a hinge which allows the lug wrench to be selectively configured as a "S" shaped lug wrench or as a "L" shaped lug wrench.

4. A lug wrench according to claim 1, wherein there is a single pair of lever bars comprising a single right-angled bar.

5. A lug wrench according to claim 1, wherein a pair of drive heads or socket heads provide a nut loosening torque of substantially twice the value of the nut tightening torque.

6. A lug wrench according to claim 1, wherein a T-bar has a non-adjustable one-way drive element located at or in the region of the drive head or socket head extremity of the top bar of the T-shaped configuration.

7. A lug wrench according to claim 2, wherein a T-bar has a one-way ratchet mechanism located at the point of intersection of the bars forming the T-shaped configuration.

8. A lug wrench according to claim 7, wherein the T-shaped configuration comprises a removable lever bar attached to the T-bar torque bar and a removable sleeve is selectively attachable to the bars, with stop means to prevent attachment of the sleeve such as to provide excessive nut tightening torque.

9. A lug wrench according to claim 7, comprising two elongate members adapted to be assembled to form the T-shape configuration.

* * * * *